United States Patent
Takezaki et al.

Patent Number: 5,504,156
Date of Patent: Apr. 2, 1996

[54] THERMOPLASTIC ELASTOMER COMPOSITION

[75] Inventors: Yoshiyuki Takezaki, Yokkaichi; Junji Kojina, Yokohama; Kazumi Nejigaki, Yokkaichi; Yoshihisa Fujinaga, Susono, all of Japan

[73] Assignee: Japan Synthetic Rubber Co., Ltd., Tokyo, Japan

[21] Appl. No.: 355,980

[22] Filed: Dec. 14, 1994

[30] Foreign Application Priority Data

Dec. 15, 1993 [JP] Japan ............... 5-343179

[51] Int. Cl.⁶ ............... C08L 53/00; C08L 53/02; C08L 33/02; C08L 9/00
[52] U.S. Cl. ............... 525/93; 525/74; 525/192; 525/196; 525/221; 525/941; 525/901; 525/193; 525/194
[58] Field of Search ............... 525/93, 74, 221, 525/196, 192

[56] References Cited

U.S. PATENT DOCUMENTS

| | | |
|---|---|---|
| 3,384,612 | 5/1968 | Brandt et al. |
| 3,454,676 | 7/1969 | Busse et al. |
| 4,567,219 | 1/1986 | Tominaga et al. |
| 4,766,174 | 8/1988 | Statz . |
| 4,965,319 | 10/1990 | Kawamoto . |
| 4,968,752 | 11/1990 | Kawamoto et al. |
| 4,986,545 | 1/1991 | Sullivan . |
| 5,098,105 | 3/1992 | Sullivan . |
| 5,191,024 | 3/1993 | Shibata et al. |
| 5,248,369 | 9/1993 | Minnick et al. |
| 5,306,779 | 4/1994 | Shibata et al. |
| 5,330,837 | 7/1994 | Sullivan . |

*Primary Examiner*—Carman J. Seccuro, Jr.
*Attorney, Agent, or Firm*—Oblon, Spivak, McClelland, Maier & Neustadt

[57] ABSTRACT

A thermoplastic elastomer composition which comprises (I) 99 to 1% by weight of a hydrogenated diene copolymer having a number average molecular weight of 50000 to 700,000 in which 80% or more of the double bonds of the conjugated diene portion of the conjugated diene polymer have been saturated, (II) 1 to 99% by weight of an ionomer resin having an α-olefin unit having 2 to 8 carbon atoms and an α,β-unsaturated carboxylic acid unit, at least part of the carboxyl group of said unsaturated carboxylic acid unit having been neutralized with a metal ion, and (III) 0 to 70% by weight of a polyolefin resin, provided that (I)+(II)+(III)=100% by weight. Said composition is excellent in moldability and gives a molded article excellent in transparency, flexibility, mechanical strength, heat resistance and impact resilience.

16 Claims, No Drawings

THERMOPLASTIC ELASTOMER COMPOSITION

BACKGROUND OF THE INVENTION

This invention relates to a thermoplastic elastomer composition, and more particularly, to a thermoplastic elastomer composition which is excellent in flexibility and heat resistance while retaining the excellent characteristic features of an ionomer resin per se which are transparency, mechanical strength, impact resilience (rebound resilience) and moldability. Said thermoplastic elastomer composition can be utilized in food uses such as food packaging sheet, cap liner and the like; daily sundries uses; sports things such as ski boots, other ski things, golf ball coatings, core materials and the like; toy uses; stationary uses such as desk mat and the like; automotive exterior and interior trim uses such as bumper guard and the like; civil engineering and construction uses such as engineering sheets, water-proof sheets and the like; domestic appliances such as cleaning corner bumper, refrigerator door seal and the like; AV apparatus uses, O.A. business apparatus uses, footwear and garment uses such as shoe sole, top lift and the like; textile uses; medical apparatus uses; chemical and mining industry materials; packaging and transporting materials; materials for agricultural industry, livestock industry and fisheries; and the like.

Ionomer resins in which at least part of the carboxyl group of an olefin-unsaturated carboxylic acid copolymer has been neutralized with a metal ion are widely used in the above-mentioned fields utilizing excellent properties, for example, abrasion resistance, transparency, stretchability, heat-sealability, oil resistance, hygienic quality, impact resistance, elasticity, flexure resistance, toughness, mechanical strength, coatability, adhesiveness, moldability and the like. Since they are, however, thermoplastic resins having a relatively low melting point, they have such disadvantages that when they are placed at a high temperature during use or secondary processing they tend to be deformed or broken by heat. Moreover, in respect of flexibility, a further improvement has been desired.

In order to solving the above problems, it has been considered to polymer-blend a resin having excellent heat resistance with the above ionomer resin to impart heat deformation resistance to the ionomer resin; however, the ionomer resins generally lack consistency with almost all resins, so that the resulting blend exhibits a delamination phenomenon, sufficient toughness and impact resistance are not obtained, and the flexibility is not improved.

For example, Japanese Patent Application Kokai No. 63-170,442 proposes blending an acrylic resin with the ionomer resin; however, this can be used only on the assumption that delamination is caused, and the flexibility of the resulting composition is not improved. Japanese Patent Application Kokai No. 60-71,653 proposes blending a propylene copolymer with the ionomer resin; however, this does not solve the delamination and flexibility problems similarly to the above.

On the other hand, when a soft elastomer such as ethylene-propylene rubber or the like is blended, there is such a problem that the characteristics inherent to the ionomer resin are lost, for example, the resulting composition is not transparent and the strength thereof is remarkably reduced.

When a softening agent such as an oil, a plasticizer or the like is added, there is such a problem that the softening agent bleeds to the surface of the resulting molded article to impair the appearance of the molded article, and the amount of the softening agent used is limited. As a result, only a hard molded article is obtained.

SUMMARY OF THE INVENTION

The present inventors have made extensive research to find such a surprising fact that when a hydrogenated diene copolymer is blended with the ionomer resin and, if necessary, an olefin resin is combined therewith, an elastomer composition excellent in flexibility and heat resistance is obtained while retaining the excellent characteristics inherent to the ionomer including mechanical strength, impact resilience, moldability and the like.

An object of this invention is to solve the above problems.

Another object of this invention is to provide a novel elastomer composition excellent in flexibility and heat resistance while retaining the excellent characteristics inherent to the above-mentioned ionomer resin including transparency, mechanical strength, impact resilience, moldability and the like.

Other objects and advantages of this invention will become apparent from the following description.

According to this invention, there is provided a thermoplastic elastomer composition which comprises (I) 99 to 1% by weight of a hydrogenated diene copolymer having a number average molecular weight of 50,000 to 700,000 in which 80% or more of the double bonds of the conjugated diene portion of the conjugated diene polymer have been saturated, (II) 1 to 99% by weight of an ionomer resin having an α-olefin unit having 2 to 8 carbon atoms and an α,β-unsaturated carboxylic acid unit, at least part of the carboxyl group of said unsaturated carboxylic acid unit having been neutralized with a metal ion, and (III) 0 to 70% by weight of a polyolefin resin, provided that (I)+(II)+(III)=100% by weight.

DETAILED DESCRIPTION OF THE INVENTION

The component (I) of this invention is a hydrogenated diene polymer having a number average molecular weight of 50,000 to 700,000, preferably 100,000 to 600,000 in which at least 80%, preferably at least 90%, more preferably at least 95% of the double bonds of the conjugated diene portion of the conjugated diene polymer have been saturated (namely, the hydrogenation degree is at least 80%, preferably at least 90% and more preferably at least 95%).

When the hydrogenation degree is less than 80%, the composition is inferior in transparency, mechanical strength, heat resistance and weather resistance. When the number average molecular weight is less than 50,000, blocking tends to be caused when the resulting hydrogenated diene copolymer is pelletized, and in addition, when the composition is blended with other resins, the resulting blend is inferior in mechanical strength and appearance of molded article. When the number average molecular weight is more than 70,000, the composition is inferior in moldability.

The hydrogenated diene polymer (I) includes hydrogenated products of diene polymers, for example, homopolymers of conjugated dienes, random copolymers of conjugated dienes with alkenyl aromatic compounds, block copolymers each consisting of an alkenyl aromatic compound polymer block and a conjugated diene polymer block, block copolymers each consisting of an alkenyl aromatic compound polymer block and an alkenyl aromatic compound-conjugated diene copolymer block and these polymers and copolymers modified with a functional group.

The hydrogenated diene polymer (I) is preferably at least one member selected from the following hydrogenated diene copolymers (I-1), (I-2) and (I-3), and in this case, the thermoplastic elastomer composition has more improved flexibility and heat resistance while retaining the excellent characteristics inherent to the ionomer resin including transparency, impact resilience, mechanical strength, moldability and the like:

(I-1) A hydrogenated diene copolymer having a number average molecular weight of 50,000 to 700,000 obtained by hydrogenating (i) an (A)-(B) or (A)-(B)-(A) block copolymer in which (A) means an alkenyl aromatic compound polymer block [referred to hereinafter as the block (A)] and (B) means a conjugated diene polymer block or a random alkenyl aromatic compound-conjugated diene copolymer block [referred to hereinafter as the block (B)], (ii) an (A)-(B)-(C) block copolymer in which (A) and (B) are defined as above and (C) means a tapered alkenyl aromatic compound-conjugated diene copolymer block in which the alkenyl aromatic compound proportion increases gradually [referred to hereinafter as the block (C)] or (iii) a functional group-modified (A)-(B), (A)-(B)-(A) or (A)-(B)-(C) block copolymer, in which block copolymers (i), (ii) and (iii), (1) the alkenyl aromatic compound/conjugated diene weight ratio in all the monomers constituting the hydrogenated diene copolymer (I-1) is 5/95 to 60/40, (2) the total amount of the bound alkenyl aromatic compound in the block (A) and the bound alkenyl aromatic compound in the block (C) is 3 to 50% by weight of the total weight of all the monomers constituting the hydrogenated diene copolymer (I-1) and the amount of the bound alkenyl aromatic compound in the block (A) is at least 3% by weight of the total weight of all the monomers constituting the hydrogenated diene copolymer (I-1), and (3) the vinyl content of the conjugated diene portion of the block (B) is more than 20%; or (iv) the block copolymer (i), (ii) or (iii) whose polymer block has been extended or branched through a coupling agent residue, to saturate 80% or more of the double bonds in the conjugated diene portion.

(I-2) A hydrogenated diene copolymer having a number average molecular weight of 50,000 to 700,000 obtained by hydrogenating (v) a (D)-(E)-(F) block copolymer in which (D) means a polymer block comprising mainly an alkenyl aromatic compound [referred to hereinafter as the block (D)], (E) means a polymer block comprising mainly a conjugated diene having a 1,2-vinyl content of more than 25% but not more than 95% [referred to hereinafter as the block (E)] and (F) means a polymer block of polybutadiene having a 1,2-vinyl content of not more than 25% [referred to hereinafter as the block (F)] or (vi) a functional group-modified (D)-(E)-(F) block copolymer, in which block copolymers (v) and (vi), (1) the content of the block (D) is 5 to 60% by weight, (2) the content of the block (E) is 30 to 90% by weight, and (3) the content of the block (F) is 5 to 60% by weight, provided that (D)+(E)+(F)=100% by weight, or (vii) the block copolymer (v) or (vi) whose polymer block has been extended or branched through a coupling agent residue, to saturate 80% or more of the double bonds in the conjugated diene portion.

(I-3) A hydrogenated diene copolymer having a number average molecular weight of 50,000 to 700,000 obtained by hydrogenating (viii) a (G)-(H) or (G)-(H)-(G) block copolymer in which (G) means a polymer block of polybutadiene having a 1,2-vinyl content of not more than 25% [referred to hereinafter as the block (G)] and (H) means a polymer block comprising mainly a conjugated diene, whose conjugated diene portion has a vinyl content of more than 25% [referred to hereinafter as the block (H)] or (ix) the block copolymer (viii) whose polymer block has been extended or branched through a coupling agent residue, to saturate 80% or more of the double bonds in the conjugated portion, or the hydrogenated diene polymer modified with a functional group.

The hydrogenated diene polymer (I) is explained below referring to the hydrogenated diene copolymers (I-1), (I-2) and (I-3).

The hydrogenated diene copolymer (I-1)

The alkenyl aromatic compound which is one of the constituents of the hydrogenated diene copolymer (I-1) is preferably styrene, t-butylstyrene, α-methylstyrene, p-methylstyrene, divinylbenzene, 1,1-diphenylstyrene, N,N-dimethyl-p-aminoethylstyrene, N,N-diethyl-p-aminoethylstyrene, vinylpyridine or the like, and more preferably styrene or α-methylstyrene. These alkenyl aromatic compounds are used alone or in admixture of two or more. The conjugated diene which is another constituent of the hydrogenated diene copolymer (I-1) is preferably 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene, 3-butyl-1, 3-octadiene or chloroprene, more preferably 1,3-butadiene, isoprene or 1,3-pentadiene, and most preferably 1,3-butadiene.

The block (A) in the hydrogenated diene copolymer (I-1) is a polymer block comprising mainly an alkenyl aromatic compound and this polymer block may comprise, in the copolymerized form, 10% by weight or less, preferably 5% by weight or less, of a vinyl compound copolymerizable therewith.

The alkenyl aromatic compound/conjugated diene weight ratio in all the monomers of the hydrogenated diene copolymer (I-1) is 5/95 to 60/40, preferably 7/93 to 50/50. When the proportion of the alkenyl aromatic compound is less than 5% by weight (in other words, the proportion of the conjugated diene is more than 95% by weight), the mechanical strength, processability and heat resistance are inferior and when the hydrogenated copolymer obtained is pelletized blocking tends to be caused. When the proportion of the alkenyl aromatic compound is more than 60% by weight (in other words, the proportion of the conjugated diene is less than 40% by weight), the hydrogenated diene copolymer (I-1) becomes resinous and the impact resistance, flexibility, low-temperature characteristics and transparency are inferior.

The total amount of the bound alkenyl aromatic compound in the block (A) and the bound alkenyl aromatic compound in the block (C) is 3 to 50% by weight, preferably 5 to 40% by weight, and more preferably 5 to 30% by weight, based on the total weight of all the monomers constituting the hydrogenated diene copolymer (I-1). When the total amount of the bound alkenyl aromatic compound in the blocks (A) and (C) is less than 3% by weight, the heat resistance and mechanical strength are inferior and when the hydrogenated diene copolymer is pelletized, blocking tends to be caused. In addition, when the hydrogenated diene copolymer is blended with other components, processability is inferior. When the total amount of the bound alkenyl aromatic compound is more than 50% by weight, the transparency, flexibility, processability and low-temperature characteristics are inferior.

The amount of the bound alkenyl aromatic compound in the block (A) is preferably at least 3% by weight, more preferably 5 to 30% by weight, of the total weight of all the monomers constituting the component (I-1). When the amount of the bound alkenyl aromatic compound in the block (A) is less than 3% by weight of the total weight of all the monomers of the hydrogenated diene copolymer (I-1), the mechanical strength, processability and heat resistance tend to become inferior when the hydrogenated diene copolymer (I-1) is blended with other components.

The vinyl content of the conjugated diene portion of the block (B) before the hydrogenation is more than 20% by weight, preferably at least 40% by weight and more preferably at least 60% by weight. When it is less than 20% by weight, the flexibility improvement effect becomes low when the hydrogenated diene copolymer (I-1) is blended with the ionomer resin (II).

The hydrogenation degree of the double bonds in the conjugated diene portion is 80% or more, preferably 90% by weight and more preferably 95% or more. When it is less than 80%, the transparency, heat resistance, weather resistance and mechanical strength are inferior.

Incidentally, the contents of the blocks (A), (B) and (C) in the hydrogenated diene copolymer (I-1) are preferably 3 to 50% by weight, 30 to 97% by weight and 0 to 50% by weight, respectively; more preferably 4 to 40% by weight, 35 to 94% by weight and 2 to 40% by weight, respectively, provided that (A)+(B)+(C)= 100% by weight. The number average molecular weights of the blocks (A), (B) and (C) are preferably in the range of from 1,500 to 350,000, in the range of from 15,000 to 679,000, and in the range of from 2,000 to 350,000, respectively; more preferably in the range of from 4,000 to 240,000, in the range of from 35,000 to 564,000 and in the range of from 2,000 to 240,000, respectively.

The number average molecular weight of the hydrogenated diene copolymer (I-1) is 50,000 to 700,000, preferably 100,000 to 600,000. When it is less than 50,000, blocking tends to be caused when the hydrogenated diene copolymer obtained is pelletized, and the mechanical strength is lowered. When it is more than 700,000, the flow property and processability are inferior.

The hydrogenated diene copolymer (I-1) used in this invention can be produced by, for example, the method disclosed in Japanese Patent Application Kokai No. 3-72, 512.

The hydrogenated diene copolymer (I-1) used in this invention may be a hydrogenation product of a block copolymer represented by one of the following formulas in which the polymer block has been extended or branched by adding a coupling agent:

[(A)-(B)]$_p$-X,

[(A)-(B)-(C)]$_p$-X and

[(A)-(B)-(A)]$_p$-X wherein (A), (B) and (C) are as defined above, p is an integer of 2 to 4 and X is a coupling agent residue.

The coupling agent which may be used in this case includes, for example, diethyl adipate, divinylbenzene, tetrachlorosilane, butyltrichlorosilane, methyldichlorosilane, tetrachlorotin, butyltrichlorotin, dimethylchlorosilane, tetrachlorogermanium, 1,2-dibromoethane, 1,4-dichloromethylbenzene, bis(trichlorosilyl)ethane, epoxidized linseed oil, tolylene diisocyanate, 1,2,4-benzene triisocyanate and the like.

The hydrogenated diene copolymer (I-2)

The alkenyl aromatic compound and conjugated diene used in the hydrogenated diene copolymer (I-2) are as defined as to the hydrogenated diene copolymer (I-1).

The block (D) which is one of the constituents of the hydrogenated diene copolymer (I-2) is a polymer block comprising mainly an alkenyl aromatic compound, and more detailedly speaking, it is preferably an alkenyl aromatic compound homopolymer block or a block of copolymer of 90% by weight or more of an alkenyl aromatic compound with a conjugated diene in which homopolymer and copolymer 80% or more of the double bonds of the conjugated diene portion is hydrogenated. When the amount of the alkenyl aromatic compound in the block (D) is less than 90% by weight, the strength and weather resistance are inferior. The content of the block (D) in the hydrogenated diene copolymer (I-2) is 5 to 60% by weight, preferably 10 to 50% by weight. When the content of the block (D) is less than 5% by weight, the heat resistance and mechanical strength are inferior. On the other hand, when it is more than 60% by weight, the processability and flexibility are inferior. The number average molecular weight of the block (D) is preferably 2,000 to 420,000.

The content of the block (E) which is one of the constituents of the hydrogenated diene copolymer (I-2) is 30 to 90% by weight, preferably 35 to 80% by weight. When the content of the block (E) is less than 30% by weight, the flexibility is lowered, while when it is more than 90% by weight, the processability and mechanical strength are lowered.

The vinyl content of the conjugate diene portion before the hydrogenation contained in the block (E) is more than 25 but not more than 95%, preferably 30 to 90%. When the conjugated diene portion before the hydrogenation of the block (E) has, when the conjugated diene is, for example, butadiene, a vinyl content of 25% or less, a polyethylene chain is formed upon hydrogenation, whereby the rubbery properties are lost. On the other hand, when said 1,2-vinyl content is more than 95%, the glass transition temperature of the hydrogenated diene copolymer becomes high and the rubbery properties are lost.

The number average molecular weight of the block (E) is preferably 15,000 to 630,000, more preferably 35,000 to 420,000, and 80% or more of the double bonds of the conjugated diene portion is hydrogenated.

Moreover, the content of the block (F) which is another constituent of the hydrogenated diene copolymer (I-2) is 5 to 60% by weight, preferably 5 to 50% by weight. When the content of the block (F) is less than 5% by weight, the mechanical strength is lowered, while when it is more than 60% by weight, the flexibility is inferior.

The 1,2-vinyl content of the butadiene portion before hydrogenation of the polybutadiene block (F) is not more than 25%, preferably less than 20%. When it is more than 25%, after the hydrogenation, the resinous properties of the hydrogenated diene copolymer are lost and the properties of the thermoplastic elastomer as the block copolymer are lost.

The number average molecular weight of the block (F) is preferably 2,500 to 420,000 and 80% or more of the double bonds of the butadiene portion of the polybutadiene block (F) is hydrogenated.

The number average molecular weight of the hydrogenated diene copolymer (I-2) used in this invention is 50,000 to 700,000, preferably 100,000 to 600,000, and when it is less than 50,000, the mechanical strength and heat resistance of the composition obtained are lowered, while when it is more than 700,000, the flow property and processability of the composition are lowered.

The hydrogenated diene copolymer (I-2) used in this invention can be obtained by, for example, the method disclosed in Japanese Patent Application Kokai No. 2-133, 406.

The hydrogenated diene copolymer (I-2) used in this invention may be a hydrogenation product of a block copolymer represented by one of the following formulas in which the polymer molecular chain has been extended or branched by adding a coupling agent:

[(D)-(E)-(F)]$_q$-Y and

[(D)-(E)-(F)]-Y-[(D)-(E)]

wherein (D), (E) and (F) are as defined above, q is an integer of 2 to 4 and Y is the coupling agent residue.

The coupling agent which may be used in this case includes the same as mentioned as to the hydrogenated diene copolymer (I-1).

The hydrogenated diene copolymer (I-3)

The alkenyl aromatic compound and conjugated diene used in the hydrogenated diene copolymer (I-3) are as defined as to the hydrogenated diene copolymer (I-1).

The hydrogenated diene copolymer (I-3) used in this invention is a hydrogenation product obtained by hydrogenating 80% or more of the double bonds in the conjugated portion of a block copolymer composed of the polybutadiene polymer block (G) having a 1,2-vinyl content of 25% or less and the polymer block (H) which is a conjugated diene homopolymer block or an alkenyl aromatic compound-conjugated diene copolymer block whose conjugated diene portion has a vinyl content of more than 25% but 95% or less, the block structure of the said block copolymer being represented by (G)-(H) or (G)-(H)-(G), or the (G)-(H) or (G)-(H)-(G) block copolymer whose polymer molecular chain has been extended or branched through a coupling agent residue.

The block (G) of the hydrogenated diene copolymer (I-3) is converted by hydrogenation into a crystalline polymer block having a structure similar to that of a conventional low density polyethylene. The 1,2-vinyl content of the polybutadiene before the hydrogenation in the block (G) is 25% or less, preferably 20% or less and more preferably 15% or less. When the 1,2-vinyl content of the polybutadiene before the hydrogenation in the block (G) is more than 25%, the lowering of the crystal melting point after the hydrogenation is remarkable and the mechanical strength is inferior.

The block (H) is a conjugated diene homopolymer block or an alkenyl aromatic compound-conjugated diene copolymer block, and by hydrogenation, when the conjugated diene is, for example, butadiene, the block (H) becomes a rubbery ethylene-butene-1 copolymer block or a polymer block exhibiting a structure similar to an alkenyl aromatic compound-ethylene-butene-1 copolymer.

Incidentally, the amount of the alkenyl aromatic compound used in the block (H) is preferably 35% by weight or less, more preferably 30% by weight or less, and most preferably 25% by weight or less, of the total weight of the monomers constituting the block (H), and when it is more than 35% by weight, the glass transition temperature of the block (H) is elevated and the low-temperature characteristics and flexibility are inferior.

The vinyl content of the conjugated diene portion before the hydrogenation of the block (H) is more than 25%, preferably more than 25% but not more than 95%, more preferably 35 to 85%, and when the vinyl content is 25% or less or more than 95%, the block (H) exhibits, when the conjugated diene is, for example, butadiene, a crystalline structure due to polyethylene chain or polybutene-1 chain, respectively, upon hydrogenation and hence, the state thereof becomes resinous and the flexibility thereof becomes inferior.

The block (G)/block (H) weight ratio in the hydrogenated diene copolymer (I-3) is preferably 5/95 to 90/10, more preferably 10/90 to 80/20. When the amount of the block (G) is less than 5% by weight [in other words, the amount of the block (H) is more than 95% by weight], the crystalline polymer block becomes insufficient and the mechanical strength is inferior. Also, when the amount of the block (G) is more than 90% by weight [in other words, the amount of the block (H) is less than 10% by weight], the flexibility is inferior.

In the hydrogenated diene copolymer (I-3) used in this invention, it is necessary that at least 80%, preferably at least 90% and more preferably at least 95%, of the double bonds in the conjugated diene portion of each of the blocks (G) and (H) be saturated by hydrogenation, and when the hydrogenation degree is less than 80%, the weather resistance and mechanical strength are inferior.

Incidentally, the weight average molecular weight of the block (G) is preferably 2,500 to 630,000, more preferably 10,000 to 480,000. The weight average molecular weight of the block (H) is preferably 5,000 to 665,000, more preferably 20,000 to 540,000.

The number average molecular weight of the hydrogenated diene copolymer (I-3) used in this invention is 50,000 to 700,000, preferably 100,000 to 600,000, and when it is less than 50,000 the mechanical strength and heat resistance of the composition obtained are lowered, and when it is more than 700,000, the flow property, processability and flexibility of the composition obtained are inferior.

The hydrogenated diene copolymer (I-3) used in this invention can be prepared by, for example, the method disclosed in Japanese Patent Application Kokai No. 3-128, 957.

The hydrogenated diene copolymer (I-3) used in this invention may be a hydrogenation product of a block copolymer represented by one of the following formulas in which the polymer molecular chain has been extended or branched by adding a coupling agent:

[(G)-(H)]$_r$-Z and

[(G)-(H)-(G)]$_r$-Z wherein (G) and (H) are as defined above, r is an integer of 2 to 4 and Z is a coupling agent residue.

The coupling agent which may be used in this case includes the same as mentioned as to the hydrogenated diene copolymer (I-1).

The hydrogenated diene copolymer (I) used in this invention may be a modified hydrogenated diene copolymer modified with a functional group.

Said modified hydrogenated diene copolymer is a hydrogenated diene copolymer containing at least one functional group selected from the group consisting of carboxyl group, acid anhydride group, hydroxyl group, epoxy group, halogen atom, amino group, isocyanate group, sulfonyl group and sulfonate group.

The method for incorporating the above functional group into the hydrogenated diene copolymer includes (1) a method which comprises subjecting to copolymerization a conjugated diene or an alkenyl aromatic compound having the above functional group in the state that the functional group of the monomer is protected to obtain a block polymer, subjecting the block polymer to deprotection after completion of the copolymerization to add the functional group to the block polymer and then hydrogenating the resulting modified block polymer, (2) a method which comprises adding a radically polymerizable monomer having a functional group to a hydrogenated diene copolymer by a known grafting reaction, and (3) a method which comprises kneading a monomer having a functional group with a hydrogenated diene copolymer in the presence or absence of an organic peroxide or an azo compound by means of a kneader, mixer, extruder or the like to add the functional group to the hydrogenated diene copolymer.

By any of these methods, the functional group can be efficiently incorporated into the hydrogenated diene copolymer; however, the above methods (2) and (3) are simple and effective in industry.

The amount of the functional group in the modified hydrogenated diene copolymer is preferably 0.01 to 10% by weight, more preferably 0.1 to 8% by weight and most preferably 0.15 to 5% by weight, based on the unmodified hydrogenated diene copolymer.

The monomer having the functional group for adding the functional group to the hydrogenated diene copolymer includes, for example, acrylic acid, methacrylic acid, itaconic acid, maleic acid, maleic anhydride, glycidyl acrylate, glycidyl methacrylate, allyl glycidyl ether, hydroxyethyl methacrylate, hydroxypropyl methacrylate, hydroxyethyl acrylate, hydroxypropyl acrylate, dimethylaminoethyl methacrylate and the like.

The amount of the hydrogenated diene copolymer (I) contained in the thermoplastic elastomer composition of this invention is 1 to 99% by weight, preferably 5 to 95% by weight and more preferably 10 to 90% by weight. When the amount is less than 1% by weight, the flexibility is inferior and when the amount is more than 99% by weight, the processability is inferior.

The ionomer resin (II) which is one of the essential constituents of the thermoplastic elastomer composition of this invention includes α-olefin copolymers of an α-olefin having 2 to 8 carbon atoms with an α,β-ethylenically unsaturated carboxylic acid, at least part of the carboxyl group in the molecule of said copolymer having been neutralized with a metal ion.

The α-olefin having 2 to 8 carbon atoms includes, for example, straight chain α-olefins such as ethylene, propylene, butene-1, pentene-1, hexene-1, heptene-1, octene-1 and the like and branched chain α-olefins such as 4-methylpentene-1, 4-methylhexene-1, 4,4-dimethylpentene-1 and the like. Among them, ethylene is preferable. These α-olefins may be used alone or in combination of two or more.

On the other hand, the α,β-ethylenically unsaturated carboxylic acid includes, for example, α,β-ethylenically unsaturated monocarboxylic acids such as acrylic acid, methacrylic acid, ethacrylic acid, crotonic acid and the like; α,β-ethylenically unsaturated dicarboxylic acids such as maleic acid, fumaric acid, itaconic acid, citraconic acid and the like; and monoesters of the dicarboxylic acids. Among them, acrylic acid and methacrylic acid are preferable. These α,β-ethylenically unsaturated carboxylic acids may be used alone or in combination of two or more.

In the copolymer used as the ionomer resin (II), the α-olefin and the α,β-ethylenically unsaturated carboxylic acid may be copolymerized, if necessary, with other monomers copolymerizable therewith, for example, acrylic or methacrylic acid esters such as methyl methacrylate, methyl acrylate, ethyl acrylate and the like; vinyl esters of saturated carboxylic acids such as vinyl acetate, vinyl propionate and the like; alkenyl aromatic compounds such as styrene, α-methylstyrene, p-methylstyrene and the like; acid anhydrides such as maleic anhydride, itaconic anhydride, citraconic anhydride, aconitic anhydride and the like; α,β-unsaturated nitriles such as acrylonitrile, methacrylonitrile and the like; acrylamide; methacrylamide; maleimide; and the like.

The type of the α-olefin copolymer is not critical and may be, for example, any of random type, block type, graft type and mixed type thereof.

In the thermoplastic elastomer composition of this invention, it is necessary that in the α-olefin copolymer used as the ionomer resin (II), at least part of the carboxyl group in the polymer obtained by copolymerizing the above α-olefin, the above α,β-ethylenically unsaturated carboxylic acid and optionally said other monomers copolymerizable therewith be neutralized with a metal ion. The metal ion includes, for example, ions of alkali metals such as lithium, sodium, potassium, rubidium, cesium and the like; ions of alkaline earth metals such as calcium, magnesium, strontium, barium and the like; and ions of transition metals such as manganese, cobalt, nickel, copper, zinc, lead and the like. These metal ions may be used alone or in combination of two or more.

The α-olefin copolymer having a carboxyl group neutralized with such a metal ion can be prepared by allowing the above metal cation to act on the base copolymer to ion-crosslink the base copolymer.

The α-olefin copolymer used as the ionomer resin (II) is preferably one composed of 80 to 99.5 mole of ethylene unit and 20 to 0.5 mole % of the α,β-unsaturated carboxylic acid unit, 10% or more of which has been neutralized with a monovalent or divalent metal cation.

The amount of the ionomer resin (II) contained in the thermoplastic elastomer composition is 99 to 1% by weight, preferably 95 to 5% by weight and more preferably 90 to 10% by weight. When the amount is more than 99% by weight, the flexibility, heat resistance and low-temperature characteristics are inferior, and when the amount is less than 1% by weight, the excellent characteristics inherent to the ionomer resin including mechanical strength, impact resilience and moldability are not obtained.

The polyolefin resin (C) used in the thermoplastic elastomer composition is a resin obtained by polymerization of at least one monoolefin by either high pressure method or low pressure method, and preferable are polyethylene, polypropylene, polybutene-1 and poly-4-methylpentene-1. These polyolefin resins may be homopolymers or may also be copolymers of the monoolefin with other monomers as shown blow.

In the polyolefin resin (C), preferable copolymerizing components include, for example, straight chain α-olefins such as ethylene (in other cases than the main constituent of the polymer is ethylene), propylene (in other cases than the main constituent of the polymer is propylene), butene-1 (in other cases than the main constituent of the polymer is butene-1), pentene-1, hexene-1, heptene-1, octene-1 and the like; branched chain α-olefins such as 4-methylpentene-1 (in other cases that the main constituent of the polymer is 4-methylpentene-1), 2-methylpropene-1, 3-methylpentene1, 5-methylhexene-1, 4-methylhexene-1, 4,4-dimethylpentene-1 and the like; unsaturated monocarboxylic acids such as acrylic acid, methacrylic acid, ethacrylic acid, crotonic acid and the like; unsaturated dicarboxylic acids such as maleic acid, fumaric acid, itaconic acid, citraconic acid and the like; monoesters of the dicarboxylic acids; acrylic or methacrylic acid esters such as methyl methacrylate, methyl acrylate, ethyl acrylate and the like; vinyl esters of saturated carboxylic acids such as vinyl acetate, vinyl propionate and the like; alkenyl aromatic compounds such as styrene, α-methylstyrene, p-methylstyrene and the like; acid anhydrides such as maleic anhydride, itaconic anhydride, citraconic anhydride, aconitic anhydride and the like; α,β-unsaturated nitriles such as acrylonitrile, methacrylonitrile and the like; diene monomers such as 1,4-hexadiene, dicyclopentadiene, ethylidenenorbornene and the like; acrylamide; methacrylamide; maleimide; and the like. These copolymerizing components may be used alone or in combination of two or more. The type of copolymer obtained by copolymerization with them is not critical and may be, for example, any of random type, block type, graft type or mixed type thereof. The amount of the copolymerizing components contained in the copolymer is preferably 20% by weight or less, more preferably 10% by weight or less.

The amount of the polyolefin resin (III) contained in the thermoplastic elastomer composition of this invention is 0 to 70% by weight, preferably 1 to 60% by weight and more preferably 2 to 50% by weight. When the polyolefin resin (III) is used in an amount of at least 1% by weight, such an effect that the heat resistance and mechanical strength are increased is obtained; however, when it is used in an amount of more than 70% by weight, the flexibility is lowered.

The thermoplastic elastomer composition of this invention may if necessary be subjected to sulfur-crosslinking, peroxide-crosslinking, metal ion-crosslinking, silane-crosslinking, resin-crosslinking and the like by a known method.

The thermoplastic elastomer composition of this invention may comprise, in addition to the hydrogenated diene polymer (I), the ionomer resin (II) and the optional polyolefin resin (III), an antioxidant, an antistatic agent, a weathering agent, a metal-inactivating agent, an ultraviolet absorber, a light stabilizer, a slipping agent, a blocking agent, an antibleed-blooming agent, a seal-improver, a crystal-nucleating agent, a flame retardant, a crosslinking agent, a co-crosslinking agent, a vulcanizing agent, a vulcanizing coagent, a bactericide, an antimold, a dispersing agent, a tackifier, a softening agent, a plasticizer, a viscosity-controlling agent, a color-protecting agent, a defoaming agent, a coloring agent such as titanium oxide, carbon black or the like, a metal powder such as ferrite or the like; an inorganic fiber such as glass fiber, metal fiber or the like; an organic fiber such as carbon fiber, aramid fiber or the like; a composite fiber, a glass bead, a glass balloon, a glass flake, asbestos, mica, calcium carbonate, an inorganic whisker such as potassium titanate whisker or the like; a filler such as talc, silica, calcium silicate, kaolin, diatomaceous earth, graphite, light stone, ebonite powder, cotton flock, cork powder, barium sulfate, fluororesin, polymer beads or the like; a mixture thereof, or other rubbery polymers such as SBR, NBR, BR, ETP, EPR, EPDM, NR, IR, 1,2-polybutadiene, AR, CR or IIR depending upon uses. In addition, the composition may comprise appropriately other thermoplastic resins than the components (I), (II) and (III), for example, diene resin, polyvinyl chloride resin, polyvinyl acetate resin, polycarbonate resin, polyacetal resin, polyamide resin, polyester resin, polyether resin, polysulfone, polyphenylene sulfide, POM or the like.

The composition of this invention can be obtained by melt-kneading the components (I), (II) and (III) by means of a known kneading machine such as an extruder, a kneader, a Banbury mixer or the like, or a kneading machine in which these are combined, or dry-blending them by means of an injection machine. In the production of the composition of this invention, all the components may be mixed at one time or any two of the components may be previously premixed, followed by adding and mixing the remaining component. Most preferably, the mixing apparatus is a single or twin screw extruder and it is possible to thereby continuously and efficiently knead the components to obtain a pelletized composition.

The composition of this invention can be formed into practically useful molded articles by a known method such as extrusion molding, injection molding, blow molding, compression molding, vacuum molding, slush molding, steam molding, laminate molding, calender molding or the like.

Also, if necessary, the composition of this invention may be subjected to a processing such as foaming, powdering, stretching, adhering, printing, coating, plating or the like.

The extrusion molded article obtained using the composition of this invention includes sheet, film, tube, profile, special shapes, net, block and the like, and can be utilized in various uses.

The thermoplastic elastomer composition of this invention has essentially excellent physical properties of thermoplastic elastomer composition and are excellent in transparency, flexibility, mechanical strength, heat resistance and moldability.

The thermoplastic elastomer composition of this invention are materials having the above-mentioned excellent characteristics and can be utilized in food uses such as food packing sheet or the like; daily sundries uses; sports things such as ski boots, other ski things, golf ball coatings, core materials and the like; toy uses; stationary uses such as desk mat and the like; automotive exterior and interior trim uses such as bumper guard and the like; civil engineering and construction uses such as engineering sheets, waterproof sheets and the like; domestic appliances such as cleaning corner bumper, refrigerator door seal and the like; AV apparatus uses, O.A. business apparatus uses, footwear and garment uses such as shoe sole, top lift and the like; textile uses; medical apparatus uses; chemical and mining industry materials; packaging and transporting materials; materials for agricultural industry, livestock industry and fisheries; and the like, and hence, is a material having a high commercial value.

DESCRIPTION OF THE PREFERRED EMBODIMENTS

This invention is explained in more detail below referring to Examples; however, this invention should not be construed to be limited thereto.

Incidentally, parts and % are by weight unless otherwise specified in the Examples and Comparative Examples.

In the Examples and Comparative Examples, various measurements and evaluations were conducted according to the following methods.

(1) Bound alkenyl aromatic compound content

Measured by an infrared analysis based on the absorption of phenyl group at 679 cm$^{-1}$.

(2) Vinyl content in conjugated diene portion

Calculated by a Hampton method using an infrared analysis.

(3) Hydrogenation degree

Calculated from $^1$H-NMR spectrum at 100 MHz using ethylene tetrachloride as a solvent.

(4) Number average molecular weight of hydrogenated diene copolymer

Obtained as a polystyrene-reduced molecular weight, by gel permeation chromatography (GPC) at 135° C. using trichlorobenzene as a solvent.

(5) Transparency

Judged visually using a compression-molded sheet having a thickness of 1 mm based on the following criteria:

o: Transparent

Δ: Substantially transparent x: Translucent (6) Flexibility

Flexural modulus was measured according to JIS K7203 by a three-point flexural test. A test specimen having a size of 15 mm×60 mm was obtained from a compression molded sheet having a thickness of 2 mm.

(7) Tensile strength

According to JIS K6301, a No. 3 dumbbell shaped test specimen was prepared from a compression-molded sheet having a thickness of 2 mm and a tensile strength at break was measured at a drawing speed of 500 mm/min.

(8) Processability

A sheet was prepared in a thickness range of 10 μm to 2 mm at a molding temperature of 190° C. to 240° C. using a T shaped coat hanger manifold dies in a 50-mmφ extruder, and the processability was evaluated based on the following criteria:

- o: Appearance of molded article had no problem and molding was possible under wide processing conditions.
- Δ: Appearance of molded article had no problem, but the processing conditions were very much limited.
- x: Appearance of molded article was bad in respects that die line appeared, surging was caused and necking was violent, and no improvement was possible irrespective of the processing conditions used.

(9) Impact resilience

Measured according to JIS K6301.

(10) Heat resistance

A ribbon-shaped sample having a size of 4 cm×20 cm was cut out of a compression-molded sheet having a thickness of 1 mm and formed into a cylinder which was used as a sample. The cylinder was stood in a Geer oven and allowed to stand at 100° C. for 30 minutes, and heat resistance was evaluated from the degree of deformation of the cylinder at that time based on the following criteria:

- o: No deformation was found in the cylinder shape.
- Δ: Some deformation was found in the cylinder shape; however, the shape before test could be judged.
- x: The cylinder was collapsed and the shape before test could not be judged.

REFERENCE EXAMPLE

The various components used in the Examples and Comparative Examples were as follows:

Hydrogenated diene polymer

Hydrogenated diene copolymers T-1 to T-34 were produced. The microstructures, number average molecular weights and hydrogenation degrees of T-1 to T-34 are shown in Tables 1, 2, 3 and 9.

Ionomer resin-1

Ionomer resin (HI•MILAN 1706, a trade name of Mitsui-Du Pont Polychemical K. K. for an ethylenemethacrylic acid copolymer neutralized with Zn ion)

Ionomer resin-2

Ionomer resin (HI•MILAN 1707, a trade name of Mitsui-Du Pont Polychemical K. K. for an ethylenemethacrylic acid copolymer neutralized with Na ion)

Polyolefin resin-1

Polypropylene (Polypropylene XF1893, a trade name of Chisso Petrochemical Corporation)

Polyolefin resin-2

Polyethylene (Polyethylene YF-30, a trade name of Mitubishi Petrochemical Co., Ltd.)

Softening agent

Paraffinic oil (PW380, a trade name of Idemitsu Kosan Co. Ltd.)

EPM

Ethylene-propylene rubber (EP07P, a trade name of Japan Synthetic Rubber Co., Ltd.)

EXAMPLES 1 TO 47 AND COMPARATIVE EXAMPLES 1 to 22

Physical properties of the elastomer compositions shown in Tables 4, 5, 6, 7, 8 and 10 were evaluated to obtain the results shown in these Tables.

From the results of Examples 1 to 47 shown in Tables 4, 5, 6 and 10, it can be seen that the elastomer compositions of this invention are superior in flexibility, transparency, strength, heat resistance, impact resilience and processability to those in Comparative Examples 1 to 22 shown in Tables 7 and 8.

In Comparative Examples 1 to 3, 9, 10, 13, 17, 18 and 22, the compounding ratios are outside the scope of this invention, so that the balance of flexibility, transparency, strength, heat resistance, impact resilience and processability is inferior.

Comparative Examples 4, 15 and 20 are examples in which hydrogenated diene copolymers having number average molecular weights larger than the scope of this invention were used as the component (I), and Comparative Examples 5, 7, 14 and 19 are examples in which hydrogenated diene copolymers having number average molecular weights smaller than the scope of this invention were used as the component (I). All these Comparative Examples are inferior in flexibility, transparency, strength, heat resistance, impact resilience and processability.

Comparative Examples 6, 8, 16 and 21 are examples in which hydrogenated diene copolymers having hydrogenation degrees smaller than the scope of this invention were used as the component (I), and are inferior in balance of transparency and processability.

Comparative Example 11 is an example in which a commercial softening agent was substituted for the hydrogenated diene copolymer (I) and is inferior in balance of flexibility, transparency, strength, heat resistance, impact resilience and processability and the softening agent bled to the surface.

Comparative Example 12 is an example in which a commercially available EPM was substituted for the hydrogenated diene copolymer (I), and is inferior in balance of flexibility, transparency, strength, heat resistance, impact resilience and processability.

TABLE 1

| Copolymer name | T-1 | T-2 | T-3 | T-4 | T-5 | T-6 | T-7 | T-8 | T-9 | T-10 |
|---|---|---|---|---|---|---|---|---|---|---|
| Sequence of block structure | A-B-A | A-B-A | A-B-C | A-B-C | A-B | A-B-A | A-B-C | A-B-C | A-B-A | A-B-C |
| Microstructure (%) | | | | | | | | | | |
| Total bound styrene content | 7 | 12 | 32 | 30 | 35 | 50 | 30 | 30 | 30 | 30 |
| Total of bound styrene contents in blocks (A) & (C) | 6 | 8 | 15 | 25 | 22 | 40 | 13 | 14 | 12 | 12 |
| Bound styrene content of block (A) | 6 | 8 | 10 | 12 | 22 | 40 | 5 | 5 | 12 | 5 |
| Vinyl content in block (B) | 79 | 82 | 68 | 75 | 80 | 42 | 40 | 38 | 4 | 85 |
| Number average molecular weight ($\times 10^4$) | 49 | 31 | 28 | 10 | 12 | 6 | 25 | 76 | 2 | 18 |
| Hydrogenation degree (%) | 99 | 99 | 97 | 97 | 95 | 99 | 97 | 99 | 99 | 75 |

TABLE 2

| Copolymer name | T-11 | T-12 | T-13 | T-14 | T-15 | T-16 | T-17 | T-18 | T-19 |
|---|---|---|---|---|---|---|---|---|---|
| Sequence of block structure | D-E-F | D-E-F | D-E-F | D-E-F | D-E-F | D-E-F | D-E-F | D-E-F | D-E-F |
| Microstructure (%) | | | | | | | | | |
| Content of block (D) | 15 | 50 | 10 | 10 | 70 | 15 | 15 | 30 | 20 |
| Content of block (E) | 70 | 30 | 80 | 40 | 15 | 60 | 45 | 40 | 65 |
| Vinyl content in block (E) | 35 | 40 | 75 | 35 | 15 | 45 | 45 | 28 | 42 |
| Content of block (F) | 15 | 20 | 10 | 50 | 5 | 25 | 40 | 30 | 15 |
| Vinyl content in block (F) | 12 | 15 | 11 | 20 | 15 | 11 | 35 | 10 | 18 |
| Number average molecular weight ($\times 10^4$) | 21 | 8 | 62 | 30 | 30 | 2 | 12 | 89 | 20 |
| Hydrogenation degree (%) | 97 | 95 | 98 | 99 | 99 | 92 | 99 | 99 | 72 |

TABLE 3

| Copolymer name | T-20 | T-21 | T-22 | T-23 | T-24 | T-25 | T-26 | T-27 | T-28 | T-29 | T-30 | T-31 |
|---|---|---|---|---|---|---|---|---|---|---|---|---|
| Sequence of block structure | G-H-G | G-H | G-H-G | G-H-G | G-H | G-H | G-H-G | G-H | G-H-G | G-H | G-H-G | G-H |
| Microstructure (%) | | | | | | | | | | | | |
| Content of block (G) | 35 | 8 | 30 | 12 | 65 | 20 | 40 | 2 | 92 | 35 | 40 | 25 |
| Vinyl content in block (G) | 11 | 8 | 12 | 7 | 18 | 15 | 11 | 20 | 10 | 40 | 12 | 16 |
| Content of block (H) | 65 | 92 | 70 | 88 | 35 | 80 | 60 | 98 | 8 | 65 | 60 | 75 |
| Vinyl content in block (H) | 35 | 40 | 78 | 30 | 45 | 45 | 32 | 50 | 40 | 40 | 12 | 55 |
| Number average molecular weight ($\times 10^4$) | 30 | 52 | 18 | 40 | 7 | 2 | 76 | 16 | 22 | 30 | 18 | 12 |
| Hydrogenation | 98 | 96 | 98 | 99 | 94 | 97 | 99 | 99 | 95 | 97 | 98 | 74 |

TABLE 3-continued

| Copolymer name | T-20 | T-21 | T-22 | T-23 | T-24 | T-25 | T-26 | T-27 | T-28 | T-29 | T-30 | T-31 |
|---|---|---|---|---|---|---|---|---|---|---|---|---|
| degree (%) | | | | | | | | | | | | |

TABLE 4

| | Example | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Compounding recipe | | | | | | | | | | | | | | |
| Component (I-1) | | | | | | | | | | | | | | |
| T-1 | 50 | | | | | | | | | | | | | |
| T-2 | | 70 | 50 | 30 | | | | | | 39 | 55 | 40 | 59 | |
| T-3 | | | | | 50 | | | | | | | | | |
| T-4 | | | | | | 50 | | | | | | | | 20 |
| T-5 | | | | | | | 50 | | | | | | | |
| T-6 | | | | | | | | 50 | | | | | | |
| T-7 | | | | | | | | | 50 | | | | | |
| Component (II) | | | | | | | | | | | | | | |
| Ionomer resin-1 | 50 | 30 | 50 | 30 | | | 50 | 50 | | | 10 | | | |
| Ionomer resin-2 | | | | | 50 | 50 | | | 50 | 40 | | 50 | 30 | 50 |
| Component (III) | | | | | | | | | | | | | | |
| Polyolefin resin-1 | | | | | | | | | | 21 | 35 | 10 | | |
| Polyolefin resin-2 | | | | | | | | | | | | | 11 | 30 |
| Evaluation | | | | | | | | | | | | | | |
| Transparency | o | o | o | o | o | o | o | o | o | o | o | o | o | o |
| Tensile strength (Kgf/cm$^2$) | 145 | 140 | 160 | 230 | 190 | 220 | 200 | 220 | 270 | 240 | 200 | 200 | 180 | 220 |
| Flexibility (Kgf/cm$^2$) | 750 | 400 | 560 | 890 | 680 | 750 | 700 | 900 | 810 | 1350 | 1400 | 1200 | 1100 | 1300 |
| Processability | o | o | o | o | o | o | o | o | o | o | o | o | o | o |
| Impact resilience | 52 | 52 | 54 | 58 | 56 | 56 | 57 | 58 | 56 | 53 | 54 | 56 | 52 | 51 |
| Heat resistance | Δ | Δ | o | o | o | o | o | Δ | o | o | o | o | o | o |

TABLE 5

| | Example | | | | | | | | | | | | |
|---|---|---|---|---|---|---|---|---|---|---|---|---|---|
| | 15 | 16 | 17 | 18 | 19 | 20 | 21 | 22 | 23 | 24 | 25 | 26 | 27 |
| Compounding recipe | | | | | | | | | | | | | |
| Component (I-2) | | | | | | | | | | | | | |
| T-11 | 30 | 50 | 70 | | | | | | | | | | |
| T-12 | | | | 50 | | | | | 55 | 35 | | 59 | |
| T-13 | | | | | 50 | | | | | | | | |
| T-14 | | | | | | 50 | | | | | 50 | 30 | 25 |
| T-15 | | | | | | | 50 | | | | | | |
| T-17 | | | | | | | | 50 | | | | | |
| Component (II) | | | | | | | | | | | | | |
| Ionomer resin-1 | 70 | 50 | 30 | 50 | | | 50 | 50 | | 50 | 30 | | |
| Ionomer resin-2 | | | | | 50 | 50 | | | 40 | | | 35 | 10 |
| Component (III) | | | | | | | | | | | | | |
| Polyolefin resin-1 | | | | | | | | | 5 | | 20 | | |
| Polyolefin resin-2 | | | | | | | | | | 15 | | 35 | 65 |
| Evaluation | | | | | | | | | | | | | |
| Transparency | o | o | o | o | o | o | Δ | o | o | o | o | o | Δ |
| Tensile strength (Kgf/cm$^2$) | 220 | 210 | 190 | 240 | 180 | 190 | 200 | 180 | 210 | 195 | 230 | 210 | 230 |
| Flexibility (Kgf/cm$^2$) | 1300 | 850 | 670 | 1050 | 600 | 720 | 800 | 650 | 1150 | 1000 | 1400 | 1100 | 1250 |
| Processability | o | o | o | o | o | o | o | o | o | o | o | o | o |
| Impact resilience (%) | 58 | 57 | 57 | 55 | 59 | 55 | 54 | 51 | 54 | 52 | 52 | 51 | 50 |
| Heat resistance | o | o | o | o | o | Δ | o | Δ | o | o | oo | Δ | o |

TABLE 6

| | Example | | | | | | | | | | | | | | | |
|---|---|---|---|---|---|---|---|---|---|---|---|---|---|---|---|---|
| | 28 | 29 | 30 | 31 | 32 | 33 | 34 | 35 | 36 | 37 | 38 | 39 | 40 | 41 | 42 | 43 |
| Compounding recipe Component (I-3) | | | | | | | | | | | | | | | | |
| T-20 | 30 | 50 | 70 | | | | | | | | | | | | | |
| T-21 | | | | 50 | | | | | | | | | | | | |
| T-22 | | | | | 50 | | | | | | | | 60 | 45 | 60 | 50 | 25 |
| T-23 | | | | | | 50 | | | | | | | | | | |
| T-24 | | | | | | | 50 | | | | | | | | | |
| T-27 | | | | | | | | 50 | | | | | | | | |
| T-28 | | | | | | | | | 50 | | | | | | | |
| T-29 | | | | | | | | | | 50 | | | | | | |
| T-30 | | | | | | | | | | | 50 | | | | | |
| Component (II) | | | | | | | | | | | | | | | | |
| Ionomer resin-1 | 70 | 50 | 30 | 50 | | | 50 | 50 | | | 50 | | 45 | 20 | | |
| Ionomer resin-2 | | | | | 50 | 50 | | | 50 | 50 | | 35 | | | 15 | 10 |
| Component (III) | | | | | | | | | | | | | | | | |
| Polyolefin resin-1 | | | | | | | | | | | | 5 | | 20 | | |
| Polyolefin resin-2 | | | | | | | | | | | | | 10 | | 35 | 65 |
| Evaluation | | | | | | | | | | | | | | | | |
| Transparency | o | o | o | o | o | o | Δ | o | Δ | o | o | o | o | o | o | Δ |
| Tensile strength (Kgf/cm²) | 260 | 200 | 200 | 200 | 180 | 200 | 210 | 170 | 260 | 210 | 290 | 240 | 200 | 240 | 210 | 220 |
| Flexibility (Kgf/cm²) | 1250 | 900 | 630 | 570 | 550 | 600 | 1100 | 430 | 1400 | 860 | 1350 | 1100 | 900 | 1350 | 1000 | 1250 |
| Processability | o | o | o | Δ | o | o | o | o | o | o | o | o | o | o | o | o |
| Impact resilience (%) | 60 | 59 | 58 | 56 | 59 | 56 | 54 | 59 | 53 | 54 | 52 | 51 | 52 | 51 | 51 | 50 |
| Heat resistance | Δ | o | o | o | o | o | o | Δ | o | Δ | o | o | o | o | o | o |

TABLE 7

| | Comparative Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Compounding recipe Component (I-1) | | | | | | | | | | | | |
| T-8 | | | | 50 | | | | | | | | |
| T-9 | | | | | 50 | | 40 | | | | | |
| T-10 | | | | | | 50 | | 30 | | | | |
| T-6 | | | 100 | | | | | | 5 | 5 | | |
| Component (II) | | | | | | | | | | | | |
| Ionomer resin-1 | 100 | | | 50 | | 50 | 50 | | 5 | | | 40 |
| Ionomer resin-2 | | 100 | | | 50 | | | 40 | | 5 | 40 | |
| Component (III) | | | | | | | | | | | | |
| Polyolefin resin-1 | | | | | | | 10 | | 90 | | 10 | 10 |
| Polyolefin resin-2 | | | | | | | | 20 | | 90 | | |
| Softening agent | | | | | | | | | | | 50 | |
| EPM | | | | | | | | | | | | 50 |
| Evaluation | | | | | | | | | | | | |
| Transparency | o | o | o | o | o | Δ | o | x | Δ | x | Δ | x |
| Tensile strength (Kgf/cm²) | 315 | 340 | 220 | 260 | 165 | 165 | 220 | 220 | 250 | 210 | 110 | 130 |
| Flexibility (Kgf/cm²) | 3600 | 4600 | 500 | 2100 | 1800 | 850 | 900 | 1200 | 8000 | 1200 | 350 | 420 |
| Processability | o | o | x | x | o | Δ | x | o | o | o | Δ | o |
| Impact resilience (%) | 61 | 62 | 52 | 56 | 41 | 39 | 38 | 38 | 36 | 38 | 38 | 39 |
| Heat resistance | x | x | o | o | Δ | x | o | Δ | o | o | x | x |

TABLE 8

| | Comparative Example | | | | | | | | | |
|---|---|---|---|---|---|---|---|---|---|---|
| | 13 | 14 | 15 | 16 | 17 | 18 | 19 | 20 | 21 | 22 |
| Compounding recipe Component (I-2) | | | | | | | | | | |
| T-16 | | 50 | | | | | | | | |
| T-18 | | | 50 | | | | | | | |

TABLE 8-continued

|  | Comparative Example | | | | | | | | | |
|---|---|---|---|---|---|---|---|---|---|---|
|  | 13 | 14 | 15 | 16 | 17 | 18 | 19 | 20 | 21 | 22 |
| T-19 |  |  |  | 50 |  |  |  |  |  |  |
| T-13 | 100 |  |  |  | 5 |  |  |  |  |  |
| Component (I-3) |  |  |  |  |  |  |  |  |  |  |
| T-25 |  |  |  |  |  |  | 50 |  |  |  |
| T-26 |  |  |  |  |  |  |  | 50 |  |  |
| T-31 |  |  |  |  |  |  |  |  | 50 |  |
| T-24 |  |  |  |  |  | 100 |  |  |  | 5 |
| Component (II) |  |  |  |  |  |  |  |  |  |  |
| Ionomer resin-1 |  | 50 |  | 50 |  |  | 50 |  |  |  |
| Ionomer resin-2 |  |  | 50 |  | 5 |  |  | 50 | 50 | 5 |
| Component (III) |  |  |  |  |  |  |  |  |  |  |
| Polyolefin resin-1 |  |  |  |  | 90 |  |  |  |  |  |
| Polyolefin resin-2 |  |  |  |  |  |  |  |  |  | 90 |
| Evaluation |  |  |  |  |  |  |  |  |  |  |
| Transparency | ○ | Δ | Δ | Δ | Δ | Δ | Δ | Δ | ○ | x |
| Tensile strength (Kgf/cm$^2$) | 140 | 180 | 210 | 160 | 260 | 190 | 240 | 170 | 260 | 210 |
| Flexibility (Kgf/cm$^2$) | 200 | 450 | 1300 | 600 | 8000 | 420 | 1300 | 540 | 400 | 1400 |
| Processability | x | Δ | x | Δ | ○ | Δ | x | Δ | x | ○ |
| Impact resilience (%) | 52 | 48 | 58 | 49 | 37 | 49 | 55 | 48 | 53 | 39 |
| Heat resistance | Δ | x | ○ | x | ○ | x | ○ | x | Δ | Δ |

TABLE 9

| Copolymer name | T-32 | T-33 | T-34 |
|---|---|---|---|
| Sequence of block structure | A-B-A | D-E-F | G-H-G |
| Microstructure (%) |  |  |  |
| Total bound styrene content | 12 |  |  |
| Total of bound styrene contents in blocks (A) and (C) | 8 |  |  |
| Bound styrene content in block (A) | 8 |  |  |
| Vinyl content in block (B) | 82 |  |  |
| Content of block (D) |  | 15 |  |
| Content of block (E) |  | 70 |  |
| Vinyl content in block (E) |  | 35 |  |
| Content of block (F) |  | 15 |  |
| Vinyl content in block (F) |  | 12 |  |
| Content of block (G) |  |  | 35 |
| Vinyl content in block (G) |  |  | 11 |
| Content of block (H) |  |  | 65 |
| Vinyl content in block (H) |  |  | 35 |
| Amount of acid added (part) | 1.5 | 1.0 | 1.2 |
| Number average molecular weight (× 10$^4$) | 31 | 21 | 30 |
| Hydrogenation degree (%) | 99 | 98 | 98 |

TABLE 10

|  | Example | | | |
|---|---|---|---|---|
|  | 44 | 45 | 46 | 47 |
| Compounding recipe |  |  |  |  |
| Component (I-1) T-32 | 50 |  |  |  |
| Component (I-2) T-33 |  | 50 |  |  |
| Component (I-3) T-34 |  |  | 50 | 45 |
| Component (II) |  |  |  |  |
| Ionomer resin-1 | 50 |  | 50 | 45 |
| Ionomer resin-2 |  | 50 |  |  |
| Component (III) |  |  |  |  |
| Polyolefin resin-2 |  |  |  | 10 |
| Evaluation |  |  |  |  |
| Transparency | ○ | ○ | ○ | ○ |
| Tensile strength (Kgf/cm$^2$) | 180 | 230 | 240 | 250 |
| Flexibility (Kgf/cm$^2$) | 560 | 850 | 900 | 900 |
| Processability | ○ | ○ | ○ | ○ |
| Impact resilience (%) | 56 | 59 | 61 | 56 |
| Heat resistance | ○ | ○ | ○ | ○ |

What is claimed is:

1. A thermoplastic elastomer composition which comprises:

(I) 99 to 1% by weight of a hydrogenated diene copolymer having a number average molecular weight of 50,000 to 700,000 obtained by hydrogenating (viii) a (G)-(H) or (G)-(H)-(G) block copolymer in which (G) means a polybutadiene polymer block having a 1,2-vinyl content of not more than 25% and (H) means a polyconjugated diene polymer block having a vinyl content of more than 25% or (ix) the block copolymer (viii) whose polymer block has been extended or branched through a coupling unit, to saturate 80% or more of the double bonds in the polyconjugated diene polymer block, (II) 1 to 99% by weight of an ionomer resin having an α-olefin unit having 2 to 8 carbon atoms and an α,β-unsaturated carboxylic acid unit, at least part of the carboxyl group of said unsaturated carboxylic acid unit having been neutralized with a metal ion, and (III) 0 to 70% by weight of a polyolefin resin, provided that (I)+(II)+(III)=100% by weight.

2. The composition of claim 1, wherein the extended or branched block copolymer (viii), taken with the coupling unit (Z), has the formula:

[(G)-(H)]$_r$-Z or [(G)-(H)-(G)]$_r$-Z, wherein r is 2 to 4.

3. The thermoplastic elastomer composition according to claim 1, wherein 90% or more of the double bonds in the conjugated diene portion of the conjugated diene polymer of the hydrogenated diene copolymer (I) are saturated.

4. The thermoplastic elastomer composition according to claim 1, wherein the hydrogenated diene copolymer (I) has a number average molecular weight of 100,000 to 600,000.

5. The thermoplastic elastomer composition according to claim 1, wherein the hydrogenated diene copolymer (I) is a hydrogenated diene copolymer modified with a functional group.

6. The thermoplastic elastomer composition according to claim 1, wherein the amount of the functional group in the modified hydrogenated diene copolymer modified with a functional group is 0.01 to 10% by weight based on the unmodified hydrogenated diene copolymer.

7. The thermoplastic elastomer composition according to claim 1, wherein the amount of the hydrogenated diene copolymer (I) is 95 to 5% by weight.

8. The thermoplastic elastomer composition according to claim 1, wherein the α-olefin unit of the ionomer resin (II) is derived from at least one α-olefin selected from the group consisting of straight chain α-olefins and branched chain α-olefins.

9. The thermoplastic elastomer composition according to claim 8, wherein the straight chain α-olefins include ethylene, propylene, butene-1, pentene-1, hexene-1, heptene-1 and octene-1, and the branched chain α-olefins include 4-methylpentene-1, 4-methylhexene-1 and 4,4-dimethylpentene-1.

10. The thermoplastic elastomer composition according to claim 1, wherein the α,β-ethylenically unsaturated carboxylic acid of the ionomer resin (II) is at least one member selected from the group consisting of acrylic acid, methacrylic acid, ethacrylic acid, crotonic acid, maleic acid, fumaric acid, itaconic acid, citraconic acid and monoesters of maleic acid, fumaric acid, itaconic acid and citraconic acid.

11. The thermoplastic elastomer composition according to claim 1, wherein the metal ion of the ionomer resin (II) is at least one metal ion selected from the group consisting of alkali metal ions, alkaline earth metal ions and transition metal ions.

12. The thermoplastic elastomer composition according to claim 11, wherein the alkali metal ions include lithium ion, sodium ion, potassium ion, rubidium ion and cesium ion; the alkaline earth metal ions include calcium ion, magnesium ion, strontium ion and barium ion and the transition metal ions include manganese ion, cobalt ion, nickel ion, copper ion, zinc ion and lead ion.

13. The thermoplastic elastomer composition according to claim 1, wherein the proportions of the α-olefin unit and the α,β-ethylenically unsaturated carboxylic acid unit are 88 to 99.5 mole % and 20 to 0.5 mole %, respectively.

14. The thermoplastic elastomer composition according to claim 1, wherein the amount of the ionomer resin (II) is 5 to 95% by weight.

15. The thermoplastic elastomer composition according to claim 1, wherein the polyolefin resin (III) is a resin obtained by polymerizing at least one monoolefin by a high pressure method or a low pressure method.

16. The thermoplastic elastomer composition according to claim 1, wherein the amount of the polyolefin resin (III) is 1 to 60% by weight.

* * * * *